United States Patent
Kwon et al.

(10) Patent No.: US 7,630,167 B2
(45) Date of Patent: Dec. 8, 2009

(54) METHOD AND APPARATUS TO DETECT SUB-MICRON PARTICLES IN A HARD DISK DRIVE WITH OPTICAL PICKUP

(75) Inventors: Haesung Kwon, San Jose, CA (US); Hyung Jai Lee, Cupertino, CA (US); Seong-Woo Kang, San Jose, CA (US); Yun-Sik Han, Santa Clara, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 365 days.

(21) Appl. No.: 10/842,798

(22) Filed: May 10, 2004

(65) Prior Publication Data

US 2005/0248876 A1   Nov. 10, 2005

(51) Int. Cl.
*G11B 33/14* (2006.01)
*G11B 5/00* (2006.01)
(52) U.S. Cl. .................................. 360/97.02; 360/128
(58) Field of Classification Search .............. 360/97.01, 360/97.02, 97.04, 128, 134.4; 720/648; 369/244.1, 369/263.1, 44.37
See application file for complete search history.

(56) References Cited

U.S. PATENT DOCUMENTS

| | | | | |
|---|---|---|---|---|
| 5,262,841 A * | 11/1993 | Blesener et al. | ............. | 356/338 |
| 5,917,332 A * | 6/1999 | Chen et al. | .................. | 324/765 |
| 6,058,085 A * | 5/2000 | Obata | ...................... | 369/53.17 |
| 6,433,934 B1* | 8/2002 | Reznichenko et al. | ........ | 359/622 |
| 6,434,088 B1* | 8/2002 | Ishizaki et al. | ........... | 369/13.33 |
| 2002/0039244 A1* | 4/2002 | Wilson | ........................ | 360/25 |
| 2002/0163861 A1* | 11/2002 | Shimazaki et al. | ........ | 369/13.09 |
| 2004/0100715 A1* | 5/2004 | Smith et al. | .................... | 360/69 |

* cited by examiner

*Primary Examiner*—William J Klimowicz
*Assistant Examiner*—Adam B Dravininkas
(74) *Attorney, Agent, or Firm*—Ben J. Yorks; Irell & Manella LLP

(57) ABSTRACT

A hard disk drive that includes an optical pick-up coupled to a head of a hard disk assembly ("HDA"). The head is located adjacent to a disk. The optical pick-up can sense the surface of the disk by detecting light reflected from the surface. The optical pick-up is coupled to a particle circuit that can distinguish between an embedded particle and a floating particle from the reflected light.

13 Claims, 2 Drawing Sheets

METHOD AND APPARATUS TO DETECT SUB-MICRON PARTICLES IN A HARD DISK DRIVE WITH OPTICAL PICKUP

BACKGROUND OF THE INVENTION

1. Field of the Invention

The present invention relates to a method and apparatus for distinguishing between an embedded particle or a floating particle on a disk of a hard disk drive.

2. Background Information

Hard disk drives contain a plurality of magnetic heads that are coupled to rotating disks. The heads can magnetize and sense the magnetic fields of the disk to write and read data, respectively. The heads are coupled to a pivoting actuator arm that has a voice coil motor.

Data is typically stored on tracks that extend radially across the disk surfaces. The voice coil motor can be energized to pivot the actuator arm and move the heads to different track locations. Each track is typically divided into a number of sectors.

The heads have air bearing surfaces that cooperate with an air flow within the hard disk drive to create air bearings. The air bearings prevent and/or minimize the mechanical wear between the heads and the surfaces of the disks. The strength of the magnetic field applied and sensed from the disk surface is an inverse function of the air bearing height. Consequently, it is desirable to minimize the air bearing height to optimize the magnetic performance of the heads.

To minimize contact between the disks and the heads it is desirable to manufacture the disk surfaces as smooth as possible. To insure that the disk surfaces comply with certain smoothness requirements, the disks are typically inspected with an apparatus commonly referred to as a disk certifier. There are various types of disk certifiers that operate with a stylus, a magnetic head and/or an optical detection system. In an optical based certifier a beam of light is reflected off the disk surface and then detected by an optical detection system. The detected reflected light is then analyzed to identify pits, particles and other anomalies on the disk surface. After inspection the disk is assembled into a sealed hard disk assembly ("HDA").

Particles may be created during the operation of the drive. For example, mechanical contact between the heads and the disk surfaces may generate small particles on the order of 0.05 to 0.2 micrometers. The particles may float onto and scratch the disk surfaces. To date, there is no way to determine the cause of a disk surface scratch within an HDA. It would be desirable to provide an apparatus and method for determining the existence of floating particles within an HDA.

BRIEF SUMMARY OF THE INVENTION

A hard disk drive with an optical pick-up coupled to a head. The head is located adjacent to a disk. The optical pick-up is coupled to a particle circuit that can distinguish between an embedded particle and a floating particle on the disk.

DETAILED DESCRIPTION

Disclosed is a hard disk drive that includes an optical pick-up coupled to a head of a hard disk assembly ("HDA"). The head is located adjacent to a disk. The optical pick-up can sense the surface of the disk by detecting light reflected from the surface. The optical pick-up is coupled to a particle circuit that can distinguish between an embedded particle and a floating particle from the reflected light.

Figure 1:
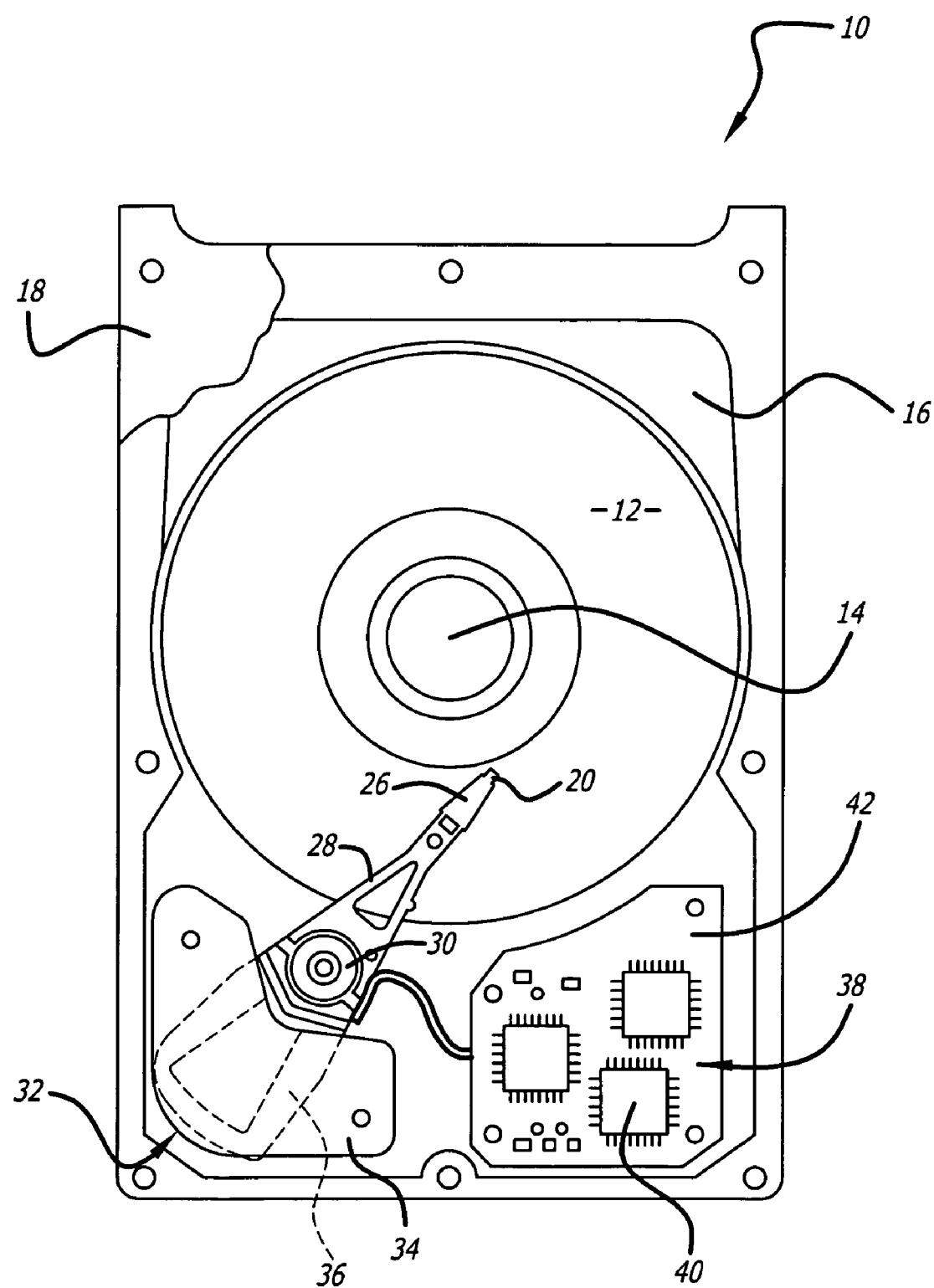
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. Each head 20 may have separate write (not shown) and read elements 21 (see FIG. 2). The heads 20 are gimbal mounted to a flexure arm 26 as part of a head gimbal assembly (HGA). The flexure arms 26 are attached to an actuator arm 28 that is pivotally mounted to the base plate 16 by a bearing assembly 30. The photo-transducer 50 may be mounted to flexure arm 26, actuator arm 28, baseplate 16 or other area of the drive 10. Alternatively, the photo-transducer 50 may be mounted to the head, with or without need for a waveguide. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 2:
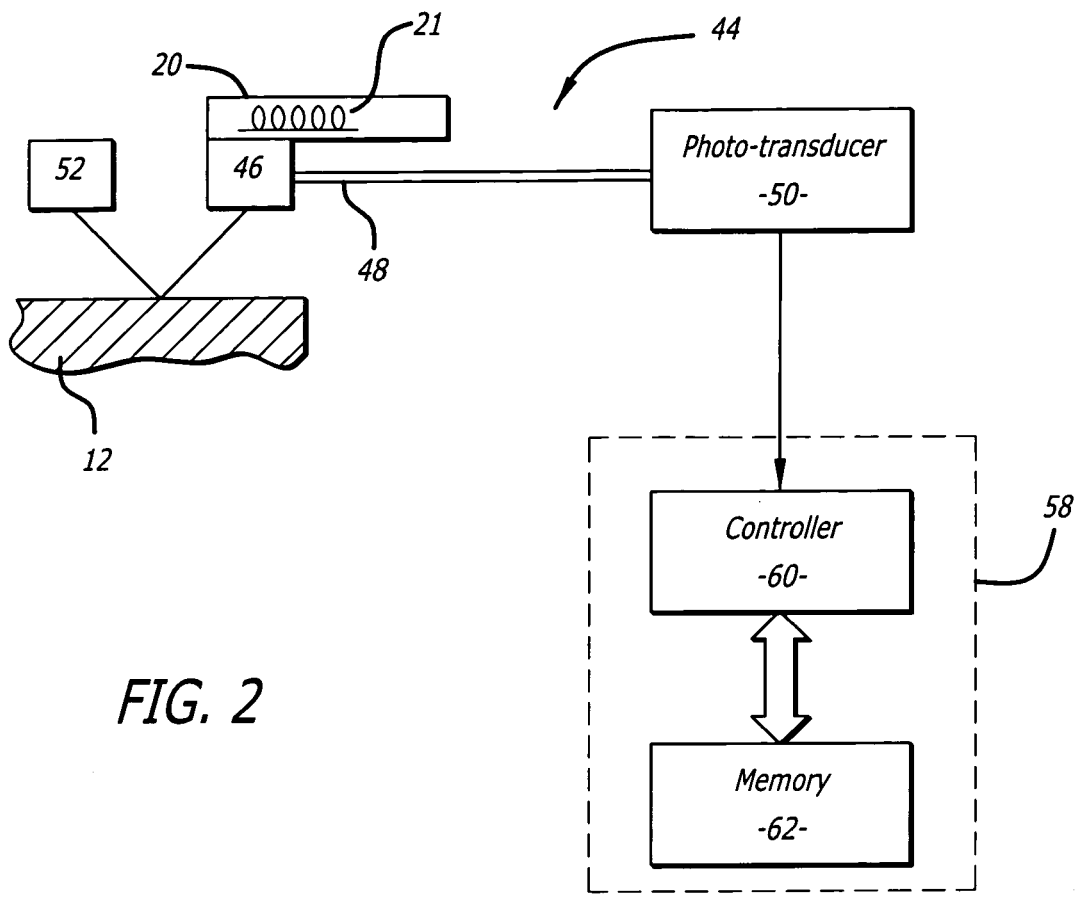
FIG. 2 is a schematic of a particle detection system of the hard disk drive.

As shown in FIG. 2, an optical pick-up 44 may be coupled to a head 20. The optical pick-up 44 may include a lens 46 that is mounted to the head 20 and connected to a waveguide 48. The proximal end of the waveguide 48 may be connected to a photo-transducer 50 such as a photodiode. The photodiode 50 provides an output signal with an amplitude that varies with the amount of light that impinges on the diode 50. The lens 46 may focus light reflected from the disk surface into the waveguide 48. The photo-transducer 50 may then detect the light. The light may be generated by a light source such as a laser diode 52.

Figure 3:
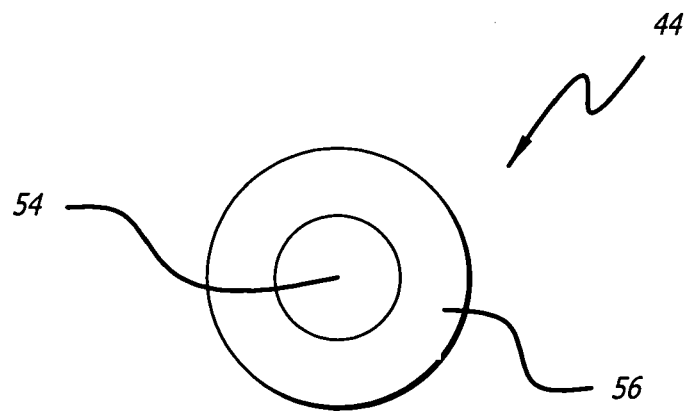
FIG. 3 is an illustration of a lens assembly.

As shown in FIG. 3, the lens 46 may actually be an assembly that includes a near field lens or aperture 54, and a far field lens or aperture 56. The photo-transducer 50 may include an array of photodiodes that can be used to distinguish between near field and far field light. Floating particles tend to scatter light and are therefore more likely to reflect light into the far field. Embedded particles tend to reflect light into the near field. Separate fields allow the system to distinguish between embedded and floating particles. The array may also include a quadrature detector that can be used to determine the slope of any particle.

The photo-transducer(s) 50 can be connected to a particle circuit 58 that can process the output signal(s) of the transducer(s) 50. By way of example, the particle circuit 58 may include a processor 60 connected to memory 62. The processor 60 may be a digital signal processor ("DSP") that also operates the disk drive. The processor 60 may operate a particle discrimination routine in accordance with instructions and data. The instructions and data may be stored in memory 62. Although a processor 60 and memory 62 are shown and described, it is to be understood that the particle circuit 58 may be constructed with dedicated logic to perform the operation of distinguishing particles.

The processor 60 may be connected to the spindle motor to receive feedback data on the position of the disk relative to the lens 46. This allows the processor 60 to correlate particle detection with disk position. The processor 60 may identify a particle as embedded when a certain output signal (particle detection) is provided by the transducer 50 on a repeatable basis (eg. repeatable run-out RRO), or floating when the output (particle detection) only occurs in a non-repeatable manner (eg. non-repeatable run-out NRRO).

The optical pick-up 44 can be implemented when trying to determine the cause of scratches on a disk surface. The HDA may be modified by replacing the head gimbal assembly of the drive with an assembly that includes the optical pick-up. The drive can then be operated so that the head flies adjacent to the disk and the optical pick-up 44 senses the disk surface. The particle circuit 58 can then identify floating particles that may be scratching the disk. The lens 46, waveguide 48 and photo-transducer 50 of the optical pick-up may be designed to detect particles less than one micron. The apparatus and method allow for detection of surface scratch sources in an HDA environment.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:
   a disk;
   a spindle motor that rotates said disk;
   a read/write head that has a read element that senses a magnetic field of said disk and provides an electrical signal;
   an optical pick-up that is coupled to said read/write head and that senses light reflected from said disk, said optical pick-up including a near field area and a far field area;
   an actuator arm coupled to said head;
   a voice coil motor coupled to said actuator arm; and,
   a particle circuit that is coupled to said optical pick-up and can distinguish between an embedded particle of said disk and a floating particle on said disk.

2. The disk drive of claim 1, wherein said optical pick-up includes a lens attached to said head.

3. The disk drive of claim 1, wherein said particle circuit includes a controller.

4. The disk drive of claim 1, wherein said particle circuit determines whether a particle detection is repeatable or non-repeatable to determine whether a particle is embedded or floating.

5. The disk drive of claim 1, wherein said optical pick-up and said particle circuit can detect particles less than one micron.

6. A hard disk drive, comprising:
   a disk that has a surface;
   a spindle motor that rotates said disk;
   a read/write head that has a read element that senses a magnetic field of said disk and provides an electrical signal;
   optical sensing means for sensing light reflected from said disk surface and generating at least one output signal and that is coupled to said read/write head, said optical sensing means including a near field area and a far field area;
   an actuator arm coupled to said head;
   a voice coil motor coupled to said actuator arm; and,
   means for processing said output signal and distinguishing between an embedded particle of said disk surface and a floating particle on said disk surface.

7. The disk drive of claim 6, wherein said optical sensing means includes a lens attached to said head.

8. The disk drive of claim 6, wherein said means for processing includes a controller.

9. The disk drive of claim 6, wherein said means for processing determines whether a particle detection is repeatable or non-repeatable to determine whether a particle is embedded or floating.

10. The disk drive of claim 6, wherein said optical sensing means and means for processing can detect particles less than one micron.

11. A method for operating a hard disk drive and distinguishing between an embedded particle and a floating particle on a disk of the hard disk drive, comprising:
    writing data onto a disk;
    reading the data from the disk with a read/write head that has a read element that senses a magnetic field of the disk and provides an electrical signal;
    sensing light reflected from a disk surface through an optical pick-up that is coupled to the read/write head and is located adjacent to a disk surface, said optical pick-up including a near field area and a far field area;
    generating at least one output signal that corresponds to the sensed disk surface; and,
    processing the output signal to distinguish between an embedded particle and a floating particle on the disk surface.

12. The method of claim 11, wherein the particle is distinguished by determining whether a particle detection is repeatable or non-repeatable.

13. The method of claim 11, wherein the detected particle is less than one micron.

* * * * *